Aug. 13, 1968 R. E. DAY ET AL 3,397,019

SEPARATOR

Filed June 23, 1966

INVENTOR.
Roger E. Day,
Clarence J. Metzger, &
Leo Stella
F. J. Fodale
ATTORNEY

United States Patent Office 3,397,019
Patented Aug. 13, 1968

3,397,019
SEPARATOR
Roger E. Day, Clarence J. Metzger, and Leo Stella, Bristol, Conn., assignors to General Motors Corporation, Detroit, Mich., a corporation of Delaware
Filed June 23, 1966, Ser. No. 560,008
5 Claims. (Cl. 308—193)

ABSTRACT OF THE DISCLOSURE

An antifriction bearing having an improved one-piece separator comprising an annular member or end ring with reversely bent resilient fingers which engage one of the bearing raceways to hold the separator in assembly and are so shaped that the separator may be removed from the same side of the bearing that it is inserted for assembly.

---

Our invention relates generally to rolling element bearing separators and more specifically to a separator which can be removed from the same side of a Conrad or similar type bearing in which it is inserted for assembly.

The object of our invention is to provide a cheap, efficient, one-piece separator for accomplishing this end. More specifically, we have sought to improve over the separator shown in the United States patent to Hickling 2,357,196 with our improvement in one of its broadest aspects residing in the fact that a separator in accordance with our invention may be removed from the same side of the bearing in which the separator is inserted for assembly.

Another object of our invention is to provide an improved separator which may be removed from the same side of the bearing in which the separator is inserted for assembly and which includes means for automatically stripping the removal tool from the separator as it is removing the separator from the bearing assembly. While best results are realized from incorporating both features of our invention, improvement will result in incorporating only the first feature of our invention. Our improved separator is especially useful in double row ball bearings where removal must occur from the same side that the separator is inserted. It is also useful in single row applications where the bearing is sealed on only one side since in such an application, it is unnecessary to remove the seal once mounted as the separator can be inserted and removed from the opposite side of the bearing.

With these and other objects in view, as will hereinafter more fully appear, and which will be more particularly pointed out in the appended claims, reference is now made to the following description taken in connection with the accompanying drawings in which:

Figure 1:
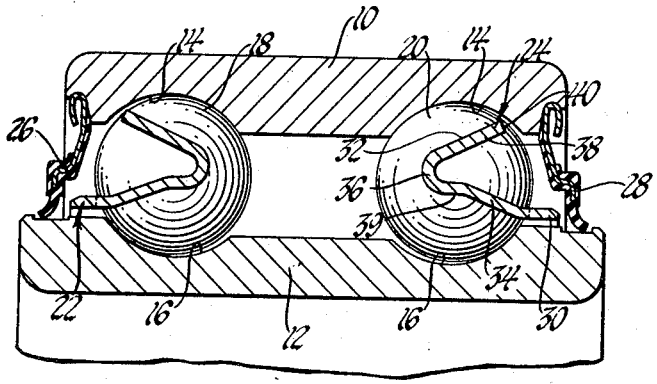
FIGURE 1 is an elevation partially in cross section of a double row ball bearing provided with a separator for each row in accordance with our invention.

Referring now to the drawings and more particularly to FIGURE 1, we have shown a double row ball bearing comprising an outer race 10 and an inner race 12 each of which are provided with a pair of axially spaced arcuate raceways 14 and 16, respectively. Two rows of balls 18 and 20 are disposed in the raceways 14 and 16. Each of the ball rows is circumferentially spaced by separators 22 and 24, respectively. The outer annular spaces of the bearing between the races 10 and 12 are closed by seals 26, 28 which are mounted in circumferential grooves in the outer ends of the outer raceway 10. The inner ends of the seals 26 and 28 terminate in resilient peripheral lips in light wiping engagement with the inner race 12. The separators 22 and 24 are identical so that a description of the left separator 24 need only be given.

Figure 4:
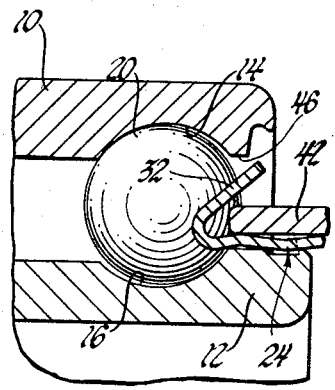
FIGURE 4 is a view similar to FIGURE 2 showing the retainer depressed and partially removed.
Figure 3:
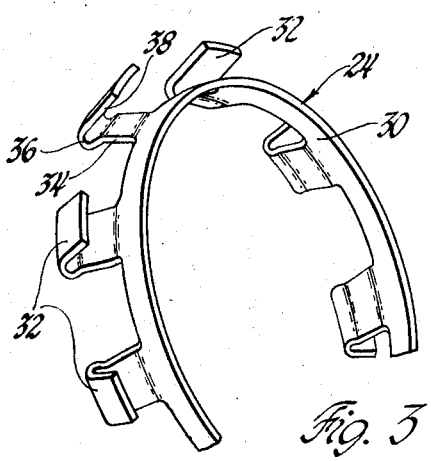
FIGURE 3 is a perspective view of the separator shown in FIGURE 1.

Referring momentarily to FIGURE 3, the separator is seen to consist of a sheet metal body comprising an annular member 30 having a number of circumferentially spaced bent over fingers 32. Returning to FIGURE 1, it is seen that the annular member 30 lies adjacent the inner race 12 and that the fingers 32 extend into the bearing interior to separate the balls 20. Each of the fingers 32 comprises a first portion 34 which is integral with the annular member 30 and extends inwardly toward the center of the ball 20 and upwardly toward the outer race 10. A second portion 38 extends radially toward the outer race 10 and axially in the opposite direction toward the outside of the bearing. The second portion 38 is integral with the first portion 34 through an intermediate curved portion 36. The second portion 38 is substantially linear and tangent to the intermediate portion 36. The first portion 34 is substantially linear but is not tangent with the curved portion 36. It extends generally toward the center of the curved portion 36 so as to provide a bump or abutment surface 39, the function of which will be understood in connection with FIGURES 4 and 5.

The tip 40 of the separator finger 32 is disposed in the raceway 14 and is thus adapted to engage the raceway 14 and limit the axial outward movement of the separator 32. Radial control of the separator is provided by the annular member 30 which is adjacent the inner race 12. The separator 24 is both removed from and inserted into the bearing assembly from its right side as viewed in the drawings.

Figure 2:
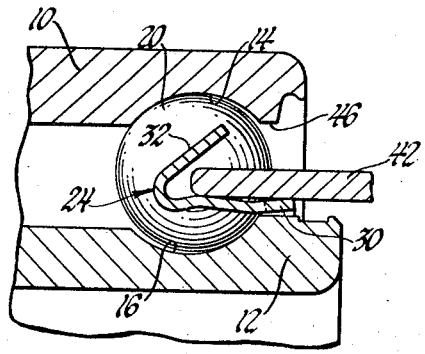
FIGURE 2 is a fragmentary view of FIGURE 1 showing the right-hand separator being depressed by a tool for removal.
Figure 5:
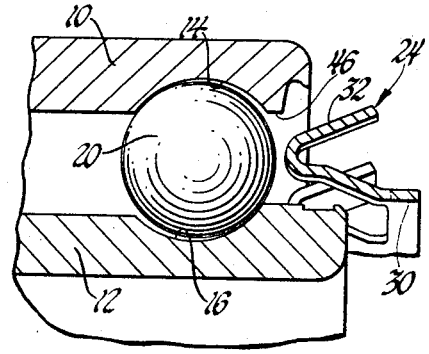
FIGURE 5 is a view similar to FIGURE 4 showing the removal tool stripped from the separator and the separator fully removed from the bearing assembly.

FIGURE 2 shows a tool 42 inserted into the bearing to remove the separator 24. The tool is annular and includes a number of circumferentially spaced fingers corresponding to the number of circumferentially spaced fingers on the separator 32. As the tool 42 is inserted into the bearing, it engages the upper surface of the finger portions 34 and cams the fingers 32 inwardly until the uppermost edge of tip 40 lies below the peripheral surface of the shoulder 46 on the outside of the bearing raceway 14. The tool 42 and separator 24 may then be moved toward the right as viewed in FIGURE 2 since the friction between the tool 42 and the depressed fingers 32 is sufficient to cause the separator to follow the tool. The tool 42 and separator 24 are withdrawn axially from the bearing assembly toward the right until finger tips 40 have cleared shoulder 46 and abutment surface 39 has engaged the inner raceway 16. This separator position is shown in FIGURE 5. Further removal of the tool 42 strips it from the separator 24 releasing the fingers 32 and allowing them to expand to their normal diameter. This action is allowable since the tip 40 has already cleared the land 46. The removed position of the separator is shown in FIGURE 6.

Thus it can be seen that we have provided a separator which may be removed from the same side of the bearing in which it is inserted for assembly. Our separator also includes means for automatically stripping the removal tool from the separator as it is removing the separator from the assembly.

In the double row ball bearing with which we have shown our separator, removal is only possible from the same side that the retainer is inserted for assembly. Thus the retainers as shown in the aforementioned Hickling patent without our improvement are inadequate.

Various modifications are contemplated and may obviously be resorted to by those skilled in the art without departing from the spirit and scope of our invention, as hereinafter defined by the appended claims, as only a preferred embodiment thereof has been disclosed.

We claim:

1. A rolling contact or antifriction bearing having relatively rotatable inner and outer races, each of said races having a pair of axially spaced generally radial shoulders and a raceway between the shoulders, antifriction elements engaging the raceways of said races and radially spacing the shoulders on said races, and a separator for the antifriction elements comprising, an annular member adjacent a first shoulder on one of said races, said member having a plurality of integral resilient fingers to space said antifriction elements, each of said fingers including a first portion extending generally axially inwardly toward said raceways and radially toward said other race, and a second portion extending axially in the opposite direction and radially toward said other race, said second portion terminating in a tip engaging the opposite shoulder on said other raceway on the same side of said antifriction elements as said first shoulder to prevent removal of said separator from the side of said first shoulder, said first portions being radially depressible, and said tips having a radial height when said first portions are depressed less than the radial spacing between said one shoulder and said opposite shoulder whereby the separator may be removed from said bearing from the side of said first shoulder.

2. The separator as defined in claim 1 wherein said first and second portions are substantially linear and are integral with and connected by a curved intermediate portion.

3. The separator as defined in claim 2 wherein the first portion is radially disposed with respect to said intermediate portion to provide an abutment surface which engages the raceway of said first race during removal of the separator after the tip has cleared the opposite shoulder.

4. In a unit-handled ball bearing assembly having inner and outer races with arcuate raceways facing each other, balls rollably engaging the raceways and orbitably movable in a pitch circle and a separator consisting of an annular member at a radial distance from one of the races which engages the balls to locate the separator axially in a first direction, and integral reversely bent fingers terminating in a free end which engages the raceway of said one race to locate the separator axially in the opposite direction, the improvement comprising, the integral reversely bent fingers being located entirely on the same side of the cylindrical plane of the annular member as said one race with the free ends of the spring fingers being at the maximum radial distance from the annular member, said fingers including deformable ramp portions accessible from the annular member side of the bearing and the free ends being at a radial distance from the annular member less than the radial distance between said annular member and said one race when said ramp portion is deformed toward the cylindrical plane of said annular member whereby said separator may be removed from said assembly.

5. In a unit-handled ball bearing of the type having races with deep groove raceways with uninterrupted shoulders and a complement of balls, said balls being circumferentially spaced by a separator to provide the unit-handled assembly; an improved separator consisting of an annular member adjacent one of the races and integral resilient reversely bent fingers terminating in a free end which engages the raceway of said other race to hold the separator in assembly, said integral reversely bent fingers being located entirely on the same side of the cylindrical plane of the annular member as said other race with the free ends of the spring fingers being at the maximum radial distance from the annular member, said fingers including ramp portions accessible from the annular member side of the bearing and which are radially movable toward said one race, and the free ends being moved out of the raceway of said other race when said ramp portion is moved toward the cylindrical plane of said annular member whereby said separator may be removed from said assembly.

References Cited

UNITED STATES PATENTS 2,357,196    8/1944    Hickling _____ 308—201

FOREIGN PATENTS 459,508    9/1949    Canada.

MARTIN P. SCHWADRON, Primary Examiner.

FRANK SUSKO, Assistant Examiner.